United States Patent [19]

Karanatsios

[11] 4,413,131
[45] Nov. 1, 1983

[54] 4,5,6,7-TETRAHALO-ISOINDOLIN-1-ONE DERIVATIVES

[75] Inventor: Dimitrios Karanatsios, Riehen, Switzerland

[73] Assignee: Sandoz Ltd., Basel, Switzerland

[21] Appl. No.: 814,559

[22] Filed: Jul. 11, 1977

[30] Foreign Application Priority Data

Jul. 16, 1976 [CH] Switzerland .................................. 9135
Oct. 20, 1976 [CH] Switzerland .............................. 13256

[51] Int. Cl.³ ............................................. C07D 209/50
[52] U.S. Cl. ........................................ 548/461; 8/189;
106/164; 106/176; 106/288 Q; 162/162
[58] Field of Search .................. 260/325 PH; 548/461

[56] References Cited

U.S. PATENT DOCUMENTS 2,973,358  2/1961  Pugin ............................ 260/325 PH
3,758,497  9/1973  Pugin et al. .................. 260/325 PH
3,867,404  2/1975  von der Crone et al. ... 260/325 PH
3,912,710  10/1975  Model et al. ................. 260/325 PH
4,008,097  2/1977  Bitterli et al. ................ 260/325 PH Primary Examiner—Alton D. Rollins
Attorney, Agent, or Firm—Gerald D. Sharkin; Richard E. Vila; Thomas C. Doyle

[57] ABSTRACT

Disclosed are compounds of formula I,

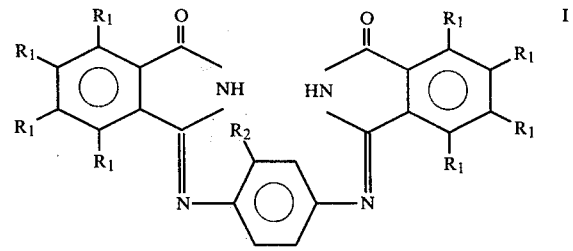

in which the
$R_1$'s, independently, are chlorine or bromine, and
$R_2$ is fluorine, chlorine, bromine, methyl, ethyl, ethoxy or tri-fluoromethyl, their production and use as pigments.

3 Claims, No Drawings

4,5,6,7-TETRAHALO-ISOINDOLIN-1-ONE DERIVATIVES

The invention relates to iso-indolinone compounds.
The invention provides compounds of formula I,

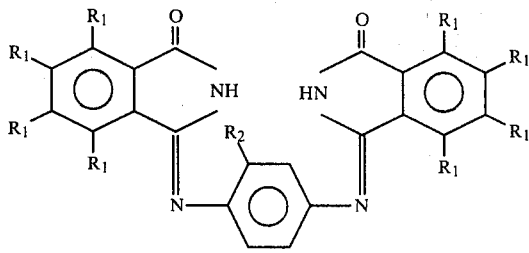

in which the

R$_1$'s, independently, are chlorine or bromine, and
R$_2$ is fluorine, chlorine, bromine, methyl, ethyl, ethoxy or tri-fluoromethyl.

Preferably the R$_1$'s are identical, most preferably all being chlorine.

Preferably R$_2$ is fluorine, chlorine, bromine, methyl, ethyl or trifluoromethyl, more preferably fluorine, chlorine, bromine or methyl, still more preferably fluorine, chlorine or bromine and most preferably chlorine.

The invention also provides a process for the production of compounds of formula I, which process comprises condensing a compound of formula II,

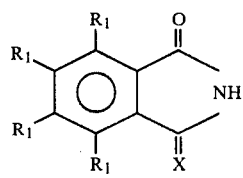

wherein
X is NH, S, (Cl)$_2$ or (OR)$_2$ where R is alkyl, preferably C$_{1-4}$alkyl and more preferably methyl or ethyl, with a compound of formula III,

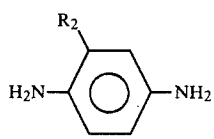

The above process is carried out in conventional manner to obtain condensation of 2 mols of compound II with 1 mol of compound III. In the compound of formula II, X is preferably (Cl)$_2$.

The compounds of formulae II and III are either known or may be obtained from available starting materials in conventional manner.

The resulting compounds of formula I may be isolated and purified in conventional manner.

The compounds of formula I are useful as pigments, e.g. for the mass pigmenting of synthetic plastics and resins, free from or containing solvents, e.g. viscose, cellulose acetate, polyethylene, polystyrene, polyvinyl chloride and synthetic leathers and rubbers, of surface coatings, such as paints, whether of an oil or water base, lacquers and inks. They may also be used in pigment printing, textile coating and for pigmenting paper in the mass. They may be employed for such uses in conventional manner and in conventional amounts.

The pigmentations obtained employing the compounds of formula I possess notably good fastness to light, weathering, migration, bleeding, over-varnishing and solvents. They also have good chemical resistance. The compounds give notably good depths of colour and have notably good application properties, e.g. resistance to flocculation and crystallisation. Their dispersion and covering capacity are also notably good. Of particular interest, however, is the light-fastness of the pigmentations obtained.

The pigments can generally be employed without post-treatment, i.e. direct from synthesis and after washing.

The following Examples, in which all parts and percentages are by weight and all temperature in degrees centigrade, illustrate the invention.

EXAMPLE 1

34 Parts of 3,3,4,5,6,7-hexachloro-iso-indolin-1-one are dissolved at 110° in 275 parts of o-dichlorobenzene. A solution of 7.2 parts of 2-chloro-1,4-diaminobenzene in 180 parts of o-dichlorobenzene (dissolved under a nitrogen atmosphere at 110°) is added over the course of 12 minutes to this solution under a nitrogen atmosphere, and the yellow suspension which forms immediately is stirred under a nitrogen atmosphere at 110° for 17 hours.

The resulting solution is filtered whilst hot, the filter residue then being washed with hot o-dichlorobenzene, methanol and hot water. After drying, the pure, deep, greenish-yellow pigment dyestuff of formula

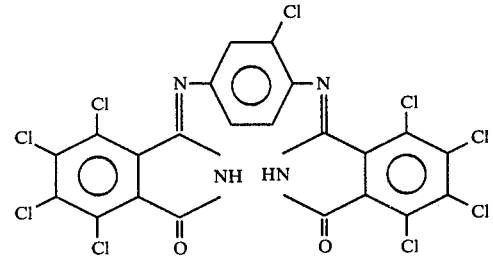

is obtained, which gives pigmentations of notable fastness to migration, light and solvents, and can be used without further after-treatment.

The pigments of the following table may be produced in a manner similar to the above procedure. They are of formula I, above.

TABLE

| Example No. | R$_1$'s | R$_2$ |
|---|---|---|
| 2 | Cl | —CH$_3$ |
| 3 | " | —CF$_3$ |
| 4 | " | —F |
| 5 | " | —OC$_2$H$_5$ |
| 6 | " | —Br |
| 7 | Br | —Cl |
| 8 | " | —F |
| 9 | Cl | —C$_2$H$_5$ |

Application Example 0.5 Parts of the pigment according to Example 1, and 5 parts of titanium dioxide pigment, are added to a basic mixture of 63 parts of polyvinyl chloride emulsion
32 parts of dioctyl phthalate
3 parts of commercial epoxy softener
1.5 parts of stabilizer (barium-cadmium-stearate)
and they are mixed together intimately.

The mixture is milled for 8 minutes for improved pigment distribution in a mixing roller set which is heated to 160° C. and which has friction rollers (one roller has a speed of 20, the other 25 revolutions per minute), and the sheet obtained whch is of 0.3 mm thickness and is of a yellow shade, is removed.

What is claimed is:

1. A compound of the formula

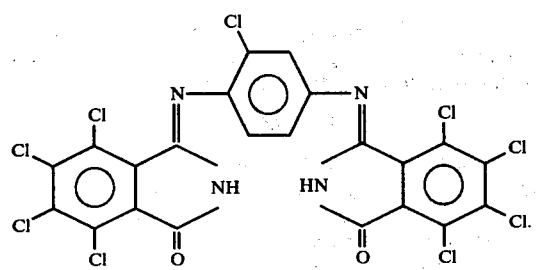

2. A compound of the formula

3. A compound of the formula

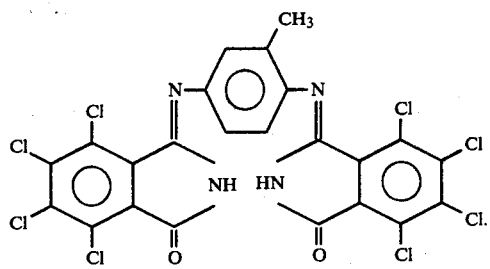

4. A compound of the formula

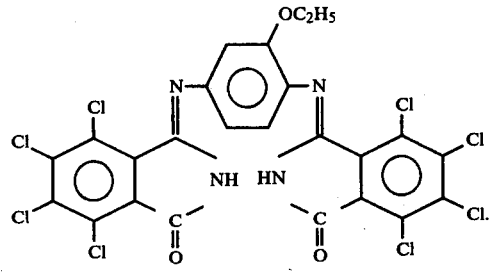

* * * * *